US011455269B1

(12) United States Patent
Valmonte et al.

(10) Patent No.: US 11,455,269 B1
(45) Date of Patent: Sep. 27, 2022

(54) RECONFIGURABLE COMMUNICATION INTERFACE FOR A DEVICE

(71) Applicant: APPLETON GRP LLC, Rosemont, IL (US)

(72) Inventors: Neil Jingo Samson Valmonte, Mandaluyong (PH); Alexander Karl Martin Manuel, Metro Manila (PH); John Perloe Martinez Sotto, Marikina (PH); Billy Jay Yap Pagsuyoin, Laguna (PH)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 17/328,567

(22) Filed: May 24, 2021

(51) Int. Cl.
 *G06F 13/40* (2006.01)
 *G06F 1/26* (2006.01)
 *G06F 13/42* (2006.01)

(52) U.S. Cl.
 CPC ............ *G06F 13/4027* (2013.01); *G06F 1/26* (2013.01); *G06F 13/4282* (2013.01); *G06F 2213/0042* (2013.01)

(58) Field of Classification Search
 CPC ..... G06F 1/26; G06F 13/4027; G06F 13/4282
 See application file for complete search history.

(56) References Cited

U.S. PATENT DOCUMENTS

| | | | | |
|---|---|---|---|---|
| 6,678,268 B1* | 1/2004 | Francis | ................. | H04L 49/101 370/380 |
| 2005/0273585 A1* | 12/2005 | Leech | ....................... | G06F 1/24 713/1 |
| 2016/0320822 A1* | 11/2016 | Fujii | ......................... | G06F 1/24 |
| 2017/0086281 A1* | 3/2017 | Avrahamy | ............ | A01G 31/02 |
| 2017/0237580 A1* | 8/2017 | Radermacher | ...... | H04L 12/2838 307/38 |
| 2019/0157981 A1* | 5/2019 | Steinberger | ........... | H02M 7/003 |
| 2020/0110454 A1* | 4/2020 | Yang | .................... | H02H 1/0092 |
| 2020/0136858 A1* | 4/2020 | Rotti | .................... | H04L 63/0464 |
| 2020/0310374 A1* | 10/2020 | Wagner | ................ | G05B 19/042 |
| 2020/0358429 A1* | 11/2020 | Schaper | ................ | H03K 3/012 |

* cited by examiner

*Primary Examiner* — Henry Tsai
*Assistant Examiner* — Christopher A Daley
(74) *Attorney, Agent, or Firm* — McDonnell Boehnen Hulbert & Berghoff LLP (57) ABSTRACT

An interface circuit that facilitates communicating information between a first system and a second system comprises a first group of ports, a second group of ports, and routing circuitry. The first group of ports is configured to be electrically coupled to the first system. The second group of ports is configured to be electrically coupled to the second system. The routing circuitry is electrically coupled to the first group of ports and the second group of ports. The routing circuitry is configured to facilitate communicating first information applied to a first port of the first group of ports to a pair of ports of the second group of ports. The routing circuitry is further configured to facilitate communicating second information between the pair of ports of the second group of ports and a pair of ports of the first group of ports when a particular signal is applied to a particular port of the second group of ports.

20 Claims, 7 Drawing Sheets

RECONFIGURABLE COMMUNICATION INTERFACE FOR A DEVICE

BACKGROUND

Field

This application generally relates to electronic devices. In particular, this application describes a reconfigurable communication interface for a device.

Description of Related Art

A power supply is an electrical device that supplies electric power to an electrical load. The primary function of a power supply is to convert electric current from a source to the correct voltage, current, and frequency to power the load. Some power supplies are configured to output various voltages at various currents and frequencies to facilitate delivering power to different loads. And some power supplies include a user interface (e.g., a display, knobs, etc.) that facilitates specifying these aspects. More sophisticated power supplies include an interface that facilitates remotely programming the power supply to supply the various output voltages. For example, in the test equipment environment, a single power supply may be programmed to output a first voltage during a first testing phase and may be reprogrammed to output a second/different voltage during a second testing phase. Moreover, the power supply may be configured to communicate parameters associated with a particular output, such as the current being drawn by the load, back to a controlling system.

SUMMARY

In a first aspect, an interface circuit that facilitates communicating information between a first system and a second system comprises a first group of ports, a second group of ports, and routing circuitry. The first group of ports is configured to be electrically coupled to the first system. The second group of ports is configured to be electrically coupled to the second system. The routing circuitry is electrically coupled to the first group of ports and the second group of ports. The routing circuitry is configured to facilitate communicating first information applied to a first port of the first group of ports to a pair of ports of the second group of ports. The routing circuitry is further configured to facilitate communicating second information between the pair of ports of the second group of ports and a pair of ports of the first group of ports when a particular signal is applied to a particular port of the second group of ports.

In a second aspect, a system comprises a first subsystem, a second subsystem, and a circuit that facilitates communicating information between the first subsystem and the second subsystem. The circuit comprises a first group of ports, a second group of ports, and routing circuitry. The first group of ports is configured to be electrically coupled to the first system. The second group of ports is configured to be electrically coupled to the second system. The routing circuitry is configured to facilitate communicating first information applied to a first port of the first group of ports to a pair of ports of the second group of ports. The routing circuitry is further configured to facilitate communicating second information between the pair of ports of the second group of ports and a pair of ports of the first group of ports when a particular signal is applied to a particular port of the second group of ports.

In a third aspect, a method for communicating information between a first system and a second system comprises configuring routing circuitry of an interface circuit that comprises a first group of ports electrically coupled to the first system and a second group of ports electrically coupled to the second system to commutatively couple a first port of the first group of ports to a pair of ports of the second group of ports to facilitate communicating first information between the first system and the second system. The method further comprises receiving, at a particular port of the second group of ports, a particular signal. The method further comprises, responsive to receiving the particular signal, re-configuring the routing circuitry to commutatively couple the pair of ports of the second group of ports to a pair of ports of the first group of ports to facilitate communicating second information between the first system and the second system.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 4A illustrates a path within the second routing circuitry through which the first information flows, in accordance with an example.

FIG. 4B illustrates a path within the second routing circuitry through which the second information flows, in accordance with an example.

DETAILED DESCRIPTION

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

Further, terms such as "A coupled to B," "A electrically coupled to B," etc., do not necessarily mean that items A and B are directly coupled to one another. For example, a first component electrically coupled to a second component is interpreted to mean that the components are either directly coupled (e.g., via a conductor) or coupled to one another via one or more resistors, capacitors, inductors, transistors, amplifiers, and/or other active or passive components.

I. Introduction

As noted above, some power supplies include an interface that facilitates remotely programming the power supply to supply various output voltages. Further, the power supply may be configured to communicate system parameters back to a controlling system. For instance, an example of a power supply disclosed herein is configured to be coupled to a universal serial bus (USB) interface of a computer to facilitate the programming of the power supply. In some cases, the power supply can communicate information back to the computer, such as the status of the power supply.

An example of this power supply is also configured to communicate a readiness state to a controlling system, such as the computer described above, or a more integrated system such as a programmable logic controller (PLC). In an example, the power supply is configured to communicate a so-called DC-OK signal to the controlling system to indicate that the power supply is ready to deliver power, is operating properly, etc.

A conventional USB interface utilizes four ports. Two of the ports are used to deliver power to downstream devices. The other two ports differentially communicate data signals between devices. On the other hand, a conventional DC-OK interface utilizes two ports. The two ports are configured to switch between a closed state (e.g., shorted to another) and an open state (i.e., having a high impedance therebetween).

Ordinarily, a device would require at least six ports to facilitate communicating both USB data (i.e., four ports) and DC-OK signals (i.e., two ports). This, in turn, would necessitate having either two discrete connectors on the device (one for each interface) or a common connector having at least six ports. Adding additional ports or custom connectors can be cost-prohibitive.

An interface that addresses these issues is disclosed herein. Generally, the interface is configured to multiplex both the USB data signals and the DC-OK signal over a four-port interface. An example of the interface circuit includes a first group of ports configured to be electrically coupled to, for example, the internal circuitry of a first system such as a power supply. The interface circuit includes a second group of ports 210 configured to be electrically coupled to a second system, such as a computer or PLC. As described in further detail below, the routing circuitry is configured to switch the configuration of the second group of ports 210 to facilitate either USB communications or DC-OK communications responsive to a signal received at one of the second group of ports. For example, a second group of ports comprising only four ports can be used to facilitate both USB communications and DC-OK communications.

Figure 1A:
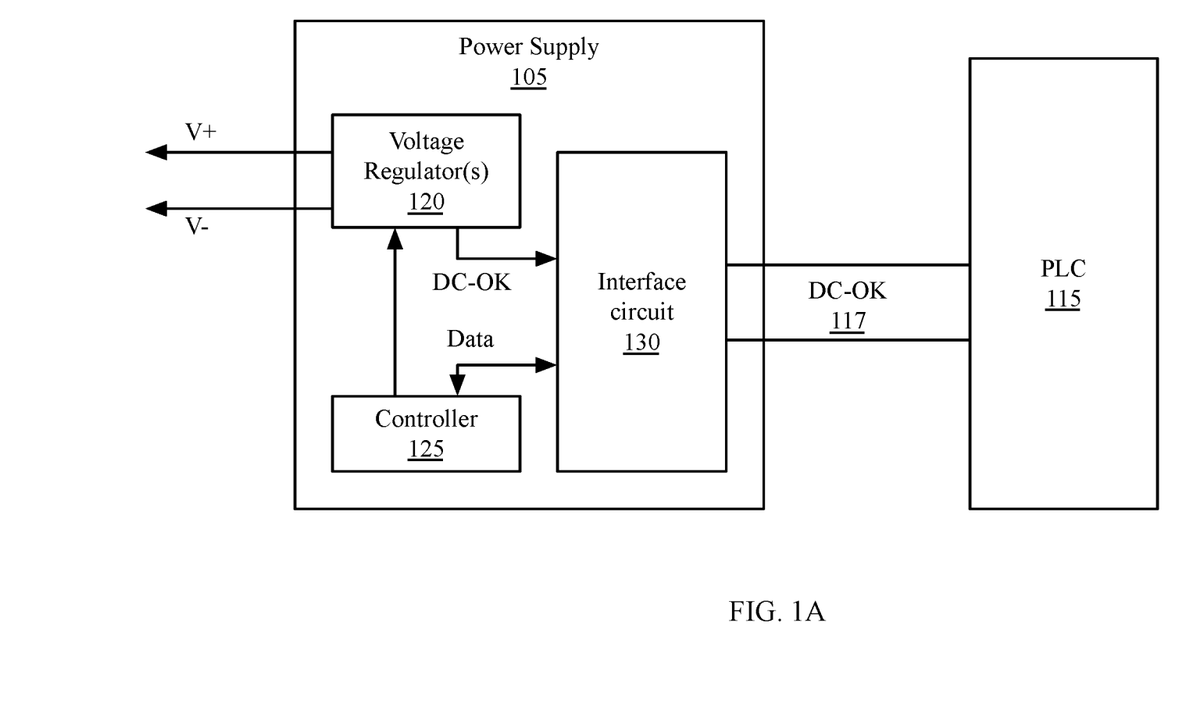
FIG. 1A illustrates an example of a power supply communicatively coupled to a programmable logic controller (PLC), in accordance with an example.
Figure 1B:
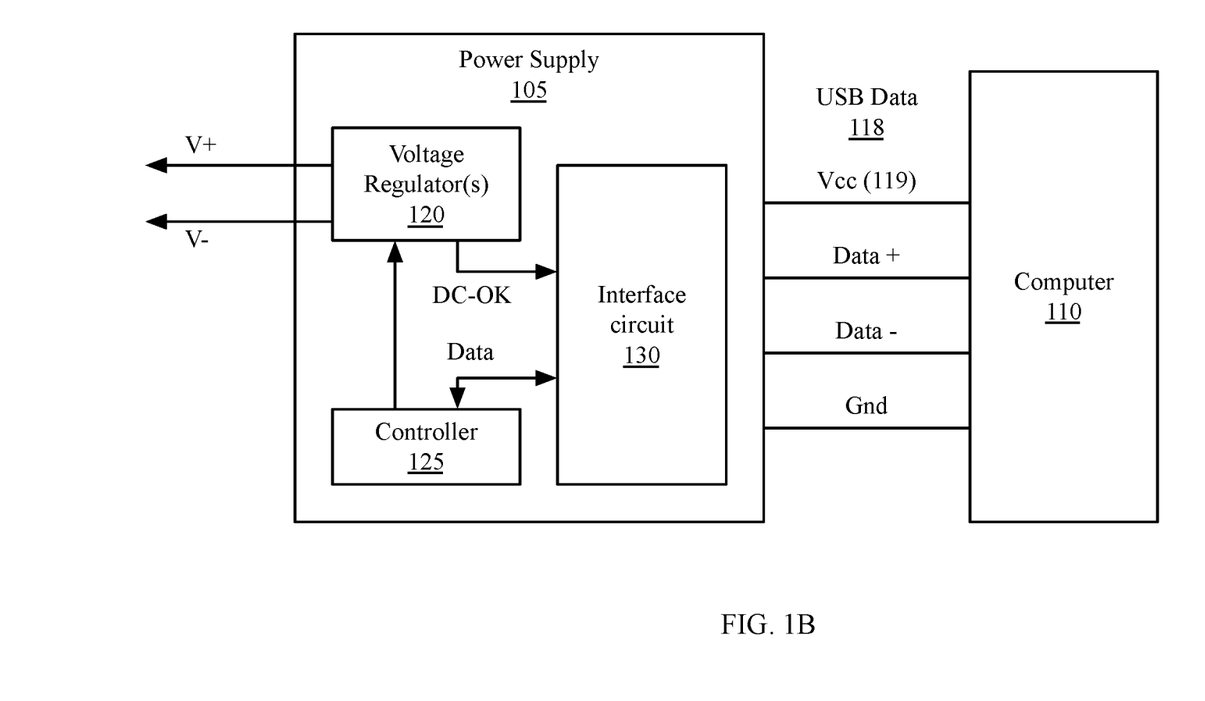
FIG. 1B illustrates an example of the power supply communicatively coupled to a computer, in accordance with an example.

FIGS. 1A and 1B illustrate an example of a power supply 105 in first and second environments, respectively. In FIG. 1A, the power supply 105 is communicatively coupled to a programmable logic controller (PLC) 115. For instance, an example of the PLC 115 corresponds to and/or includes a microcontroller, a memory with instruction code, programmable logic, etc. The PLC 115 and the power supply 105 may be part of a larger system, and the PLC 115 may be configured to control various aspects of that system. In an example, the PLC 115 is configured to wait until the power supply 105 has reached a steady-state condition (e.g., one or more regulated output voltages have reached a nominal voltage) before performing certain other functions that require the power supply 105 to be in the steady-state condition. An example of the PLC 115 is configured to delay performing certain operations until after receiving a signal from the power supply 105 indicative of whether the power supply 105 is in the steady-state condition. In an example, this signal corresponds to a so-called DC-OK signal. An example of the DC-OK signal changes state (e.g., open to closed, low voltage to high voltage, etc.) to indicate that the power supply 105 has reached the steady-state condition.

In FIG. 1B, the power supply 105 is communicatively coupled to a computer 110. For instance, in an example, the power supply 105 is communicatively coupled to a universal serial port (USB) of the computer 110. As described further below, this configuration facilitates programming various aspects of the power supply 105. It should be appreciated that the principles disclosed herein can be applied to other communication interfaces of a computer. For example, in other examples, the power supply 105 can be communicatively coupled to a computer via a universal asynchronous receiver-transmitter (UART) port, parallel port, or a different port.

An example of the power supply 105 comprises one or more voltage regulators 120, a controller 125, and an interface circuit 130. An example of the one or more voltage regulators 120 includes one or more linear regulators, switch-mode regulators, etc. Examples of the one or more voltage regulators 120 output a DC voltage, an AC voltage, etc. An example of a regulator outputs a complex voltage waveform (e.g., a square wave, triangle wave, sawtooth wave, etc.). In an example, the amplitude and/or frequency of the output voltage is configurable (e.g., −100 V to 100 V, 0 Hz, 20 kHz, etc.). Where the power supply 105 outputs a complex waveform, various timesteps, voltages, etc., that define the shape of the waveform are configurable.

An example of the power supply 105 is configured to communicate the DC-OK signal described above to the interface circuit 130 when, for example, one or more of the voltage regulators 120 have reached a steady-state condition. In some examples, after the steady-state condition has been achieved, the DC-OK signal is used to indicate a problem of some kind with the power supply 105. For instance, an example of the DC-OK signal changes state to indicate loss of regulation, an overcurrent condition, an over-temperature condition, etc.

An example of the controller 225 includes a processor and a memory that stores instruction code executable by the processor that facilitates controlling the voltage regulator 120 to perform one or more of the voltage regulator functions described above. An example of the controller 125 is communicatively coupled to the interface circuit 130 to communicate information to the computer 110 described above. In this regard, an example of the controller 125 is configurable via the interface circuit 130 and by the computer 110. For instance, an example of the controller 125 is configured to receive instructions from the computer 110 that facilitate programming voltage settings, current limits, waveform shapes, etc.

An example of the interface circuit 130 is configured to facilitate communicating the DC-OK signal 117 to, for example, the PLC 115, as illustrated in FIG. 1A. The interface circuit 130 is further configured to facilitate communicating data (e.g., USB data 118) to, for example, the computer 110, as illustrated in FIG. 1B.

Figure 2:
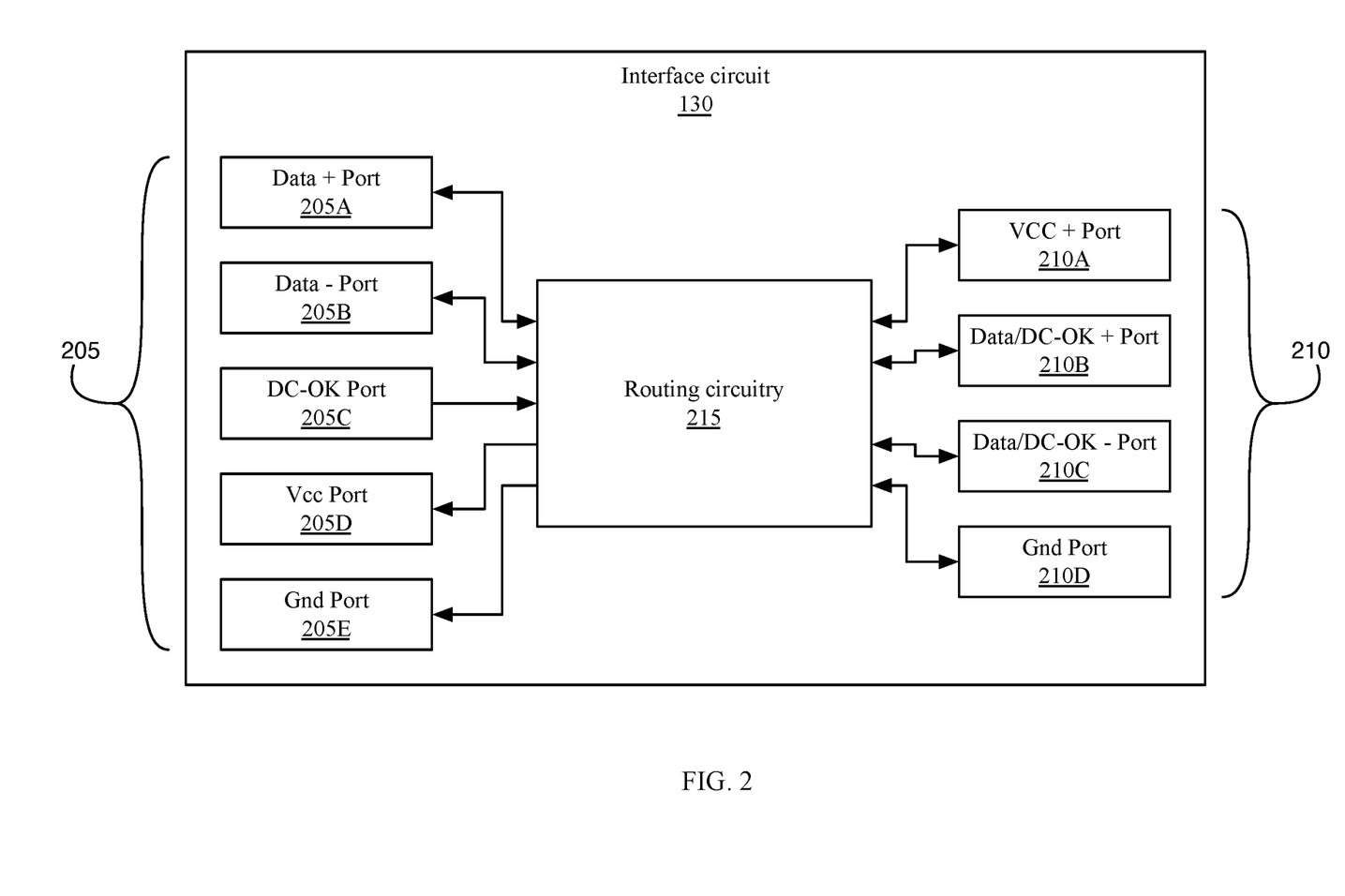
FIG. 2 is a schematic diagram of an interface circuit of the power supply, in accordance with an example.

FIG. 2 is a schematic diagram of an example of the interface circuit 130. The interface circuit 130 includes a first group of ports 205, a second group of ports 210, and routing circuitry 215.

The first group of ports 205 is configured to be electrically coupled to the subsystems of the power supply 105. For example, a first port 205A (e.g., Data+port) and a second port 205B (e.g., Data−port) are configured as data ports to be coupled to the controller 125 of the power supply 105. A third port 205C (e.g., DC-OK port) is configured as a DC-OK port to be coupled to the voltage regulator 120. A fourth port 205D (e.g., Vcc port) and a fifth port 205E (e.g., Gnd port) are configured as power supply ports to be coupled to, for example, the controller 125 to facilitate providing power to the controller 125.

The second group of ports 210 is configured to be electrically coupled to a second system. For instance, in an example, the second group of ports 210 is configured to be electrically coupled to the computer 110, described above. In this example, a first port 210A (e.g., Vcc+port) and a fourth port 210D (e.g., GND port) of the second group of ports 210 are configured to receive power and to be coupled to a power port of the computer 110 (e.g., the power pins of a USB port). A second port 210B (e.g., Data/DC-OK+port) and third port 210C (Data/DC-OK−port) of the second group of ports 210 are configured as data ports to be coupled to corresponding data ports of the computer 110 (e.g., USB data ports).

In another example, the second group of ports 210 is configured to be electrically coupled to the PLC 115 described above. In this example, the second port 210B (e.g., Data/DC-OK+port) and third port 210C (Data/DC-OK−port) of the second group of ports 210 are configured as DC-OK ports to be coupled to an input of the PLC 115 configured to receive a DC-OK signal.

An example of the interface circuit 130 includes routing circuitry 215 electrically coupled to the first group of ports 205 and the second group of ports 210. The routing circuitry 215 is configured to facilitate communicating first information 117 (e.g., DC-OK signal) applied to a first port 205C (e.g., DC-OK port) of the first group of ports 205 to the pair of ports (210B, 210C) (e.g., Data/DC-OK+ and Data/DC-OK ports) of the second group of ports 210. The routing circuitry 215 is further configured to facilitate communicating second information 118 (e.g., USB data) applied to a pair of ports (210B, 210C) (e.g., Data/DC-OK+ and Data/DC-OK ports) of the second group of ports 210 to a pair of ports (205A, 205B) (e.g., Data+ and Data−ports) of the first group of ports 205 when a particular signal is applied to a particular interface port 210A.

In an example, the particular port 210A corresponds to the first port 210A (e.g., Vcc+port) of the second group of ports 210, and the particular signal 119 corresponds to the voltage output from a USB port of the computer 110. For instance, an example of the particular signal 119 corresponds to a +5 Volt DC voltage, +3.3 Volt DC voltage, etc. When the voltage input into the Vcc+port is at ground potential or a margin below the nominal Vcc voltage of the USB port (e.g., 50% of nominal voltage), the routing circuitry 215 is configured to route the first information 117 (e.g., DC-OK information), as described above.

As noted above, the second group of ports 210 comprises a second pair of ports (210A, 210D) (e.g., Vcc+ and Gnd ports) that are configured to be coupled to a power port of the computer 110 (e.g., the power pins of a USB port). In an example, the routing circuitry 215 is configured to electrically couple the second pair of ports (210A, 210D) to the fourth port 205D (e.g., Vcc port) and the third port 205E (e.g., Gnd port) of the first group of ports 205, respectively, when the particular signal 119 described above is applied.

Figure 3:
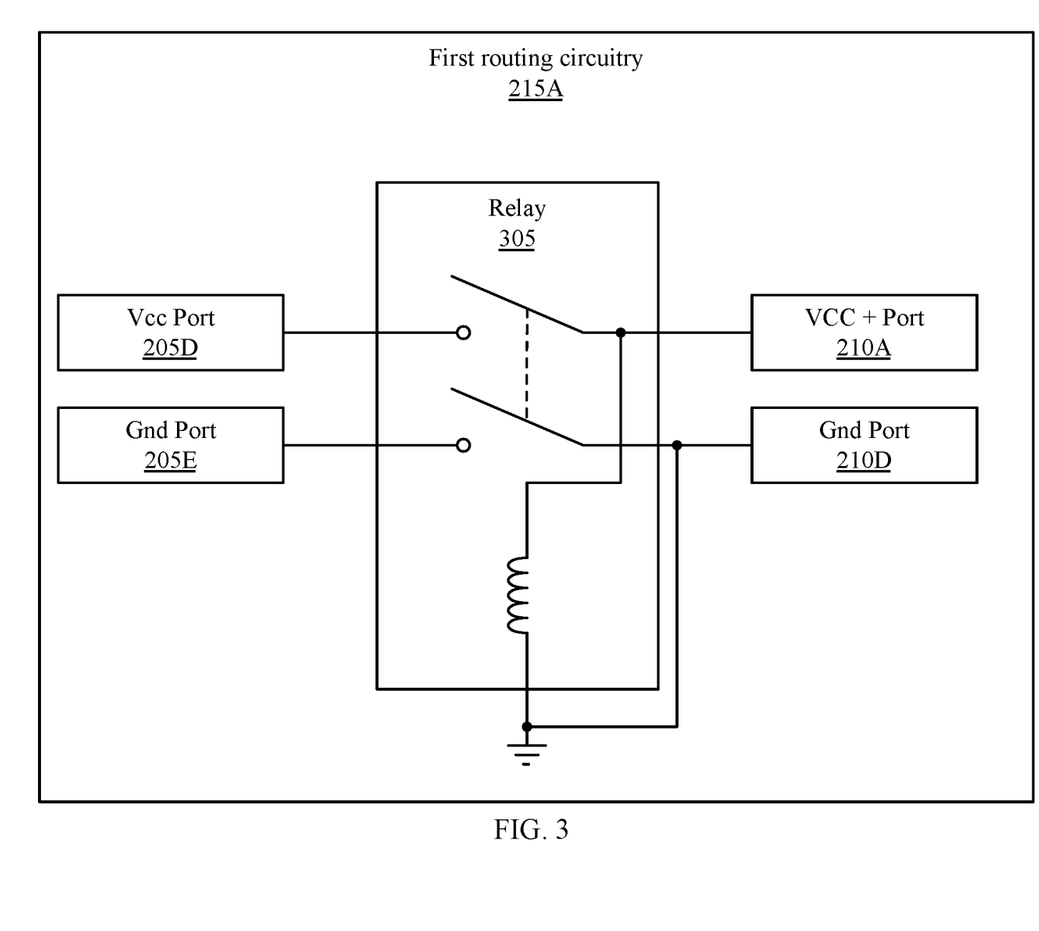
FIG. 3 is a schematic representation of first routing circuitry of the interface circuit that facilitates coupling of power to a power supply port and ground port of the power supply, in accordance with an example.

FIG. 3 is a schematic representation of an example of first routing circuitry 215A that facilitates coupling of power to the fourth port 205D (e.g., Vcc port) and the third port 205E (e.g., Gnd port) of the first group of ports 205. The routing circuitry 215 includes a relay 305. An example of the relay 305 is a mechanical relay that includes a coil. An example of the relay 305 is a double throw relay that facilitates coupling two input ports of the relay 305 to two output ports of the relay 305. As shown, a first port of the coil is electrically coupled to the first port 210A (e.g., Vcc+port) of the second group of ports 210, and the second port of the coil is electrically coupled to the fourth port 210D (e.g., Gnd port) of the second group of ports 210.

In operation, when the particular signal 119 described above (e.g., +5V) is applied to the first port 210A (e.g., Vcc+port), the coil energizes/magnetizes. This, in turn, closes the contacts of the relay 305 and, therefore, electrically couples the first port 210A (e.g., Vcc+port) of the second group of ports 210 to the fourth port 205D (e,g., Vcc port) of the first group of ports 205, and electrically couples the fourth port 210D (e.g., Gnd port) of the second group of ports 210 to the fifth port 205E (e.g., Gnd port) of the first group of ports 205.

Figure 4A:
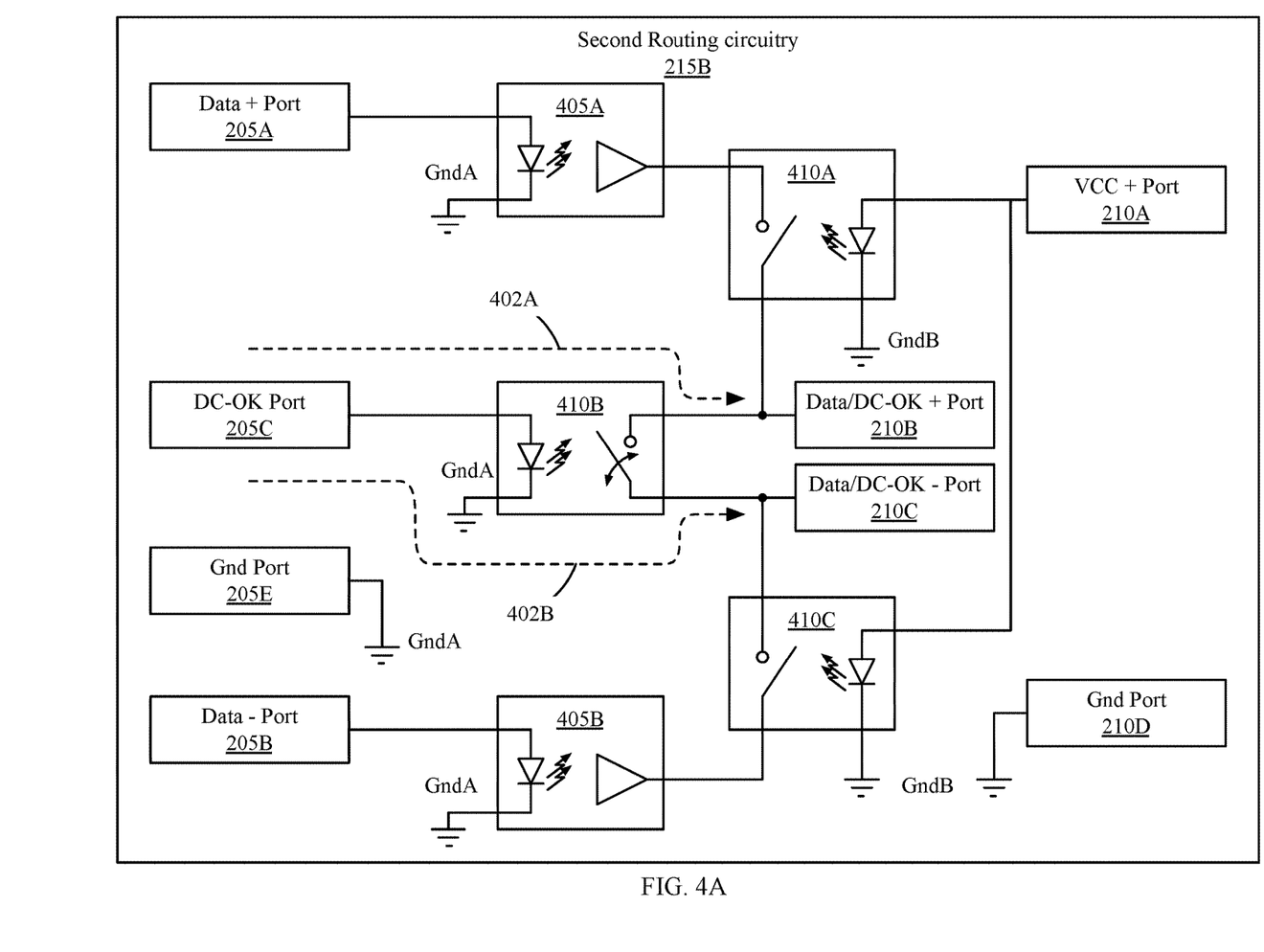
FIGS. 4A and 4B are schematic representations of second routing circuitry that facilitates communicating first and second information between the power supply and another system, in accordance with an example.
Figure 4B:
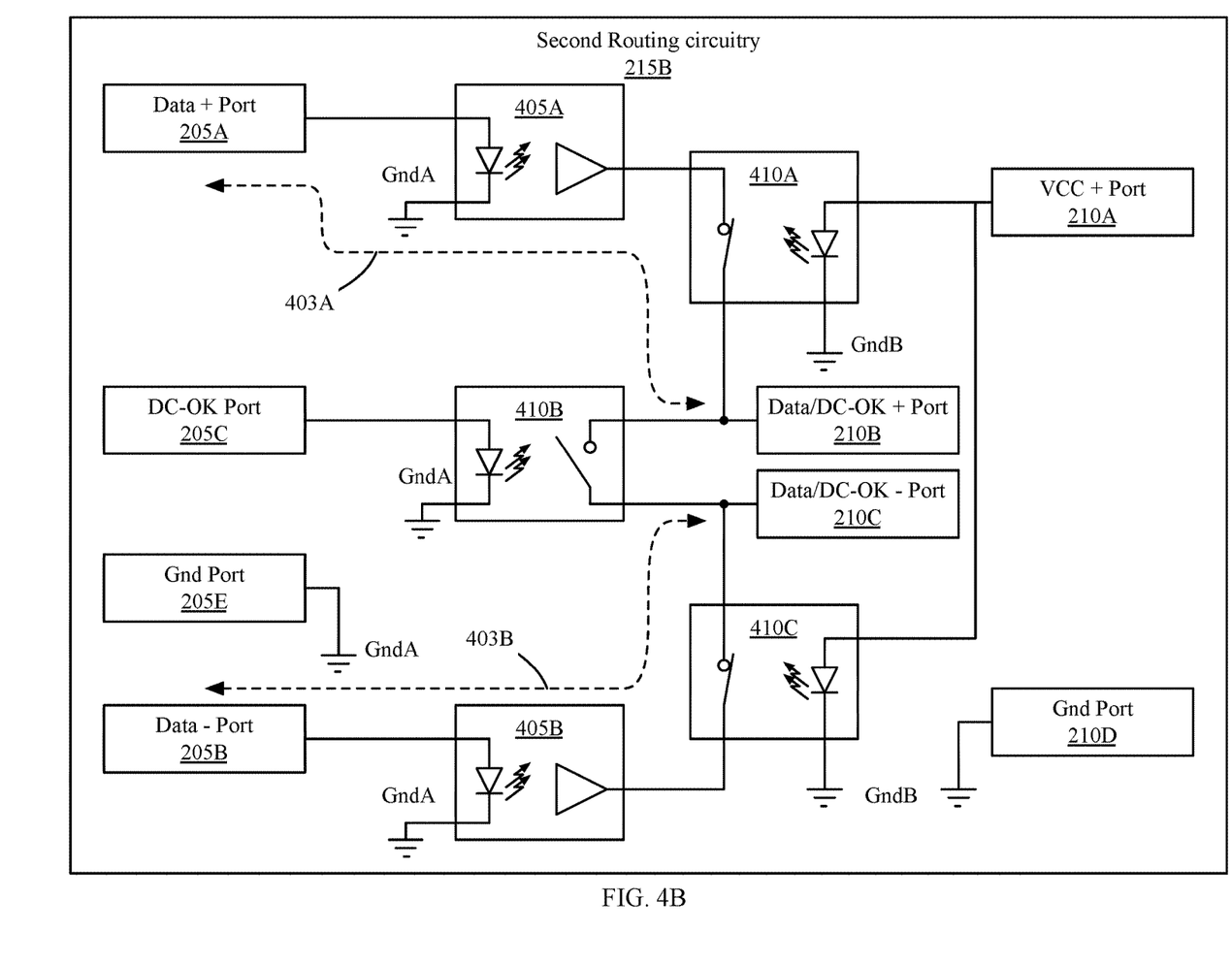

FIGS. 4A and 4B are schematic representations of second routing circuitry 215B that facilitate communicating the first information 117 and the second information 118, described above. FIG. 4A illustrates the path (402A, 402B) within the second routing circuitry 215B through which the first information 117 (e.g., DC-OK signal) flows. FIG. 4B illustrates the path (403A, 403B) within the second routing circuitry 215 through which the second information 118 (e.g., USB signals) flows.

Referring to FIG. 4A, the second routing circuitry 215 includes a first optocoupler 405A, a second optocoupler 405B, a first optical relay 410A, a second optical relay 410B, and a third optical relay 410C.

An example of the first and/or second optocouplers (405A, 405B) includes an input port and an output port. Each optocoupler (405A, 405B) facilitates optically coupling a signal input into the input port of the optocoupler (405A, 405B) to the output port of the optocoupler (405A, 405B). For instance, an example of the optocoupler (405A, 405B) includes a source of light such as an LED, a dielectric barrier in the center, and a sensor such as a phototransistor/amplifier. The optocoupler (405A, 405B) facilitates the transfer of electrical signals between two isolated circuits by using light and prevents transient voltages (e.g., 10 kV) from passing between systems coupled on either side of the optocoupler. The optocoupler (405A, 405B) facilitates optically communicating an analog signal between the systems such as sinusoidal waveforms, square waves, or other complex waveforms.

For the sake of simplicity, the optocouplers (405A, 405B) are illustrated as being unidirectional. That is, the signal flows through the optocouplers (405A, 405B) in one direction. Such optocouplers (405A, 405B) can be used in systems that communicate information unidirectionally over ports, such as a UART, which utilizes a first port to transmit a signal and a second port to receive a signal. In other examples, the optocouplers (405A, 405B) are bi-directional and facilitate bi-directional communications over a particular port, such as the differential data ports a USB port (e.g., Data+ and Data−ports).

An example of the first, second, and/or third optical relays (410A, 410B, 410C) includes a pair of switch ports and a pair of control ports. Each optical relay (410A, 410B, 410C) facilitates optically closing an internal switch coupled to the switch ports. An example of the optical relay (410A, 410B, 410C) includes a pair of back-to-back MOSFETs with their source pins tied together. The drain of a first MOSFET is coupled to a first switch port, and the drain of the second MOSFET is coupled to the second switch port. The control ports are electrically coupled to a light source such as an LED. Application of a voltage across the control ports illuminates the light source, which in turn triggers the MOSFETs to close, thus allowing a signal to pass between the switch ports.

Referring to the figures, the input port of the first optocoupler 405A is electrically coupled to the Data+port of the first group of ports 205. The output port of the first optocoupler 405A is electrically coupled to a first switch port of the first optical relay 410A.

The input port of the second optocoupler 405B is electrically coupled to the Data−port of the first group of ports 205. The output port of the second optocoupler 405B is electrically coupled to a first switch port of the third optical relay 410C.

As noted above, a first switch port of the first optical relay 410A is electrically coupled to the output port of the first optocoupler 405A. The second switch port of the first optical relay 410A is electrically coupled to a first switch port of the second optical relay 410B and to the Data/DC-OK+port of the second group of ports 210. A first control port of the first optical relay 410A is electrically coupled to the Vcc+port of the second group of ports 210. The second control port of the first optical relay 410A is electrically coupled to the GND port of the second group of ports 210.

As noted above, the first switch port of the second optical relay 410B is electrically coupled to the second switch port of the first optical relay 410A. The second switch port of the second optical relay 410B is electrically coupled to a first switch port of the third optical relay 410C and to the Data/DC-OK−port. A first control port of the second optical relay 410B is electrically coupled to the DC-OK port of the first group of ports 205. The second control port of the second optical relay 410B is electrically coupled to the GND port of the first group of ports 205.

As noted above, the first switch port of the third optical relay 410C is electrically coupled to the second switch port of the second optical relay 410B and to the Data/DC-OK−port of the second group of ports 210. The second switch port of the third optical relay 410C is electrically coupled to the output port of the second optocoupler 405B. A first control port of the third optical relay 410C is electrically coupled to the Vcc+port of the second group of ports 210. The second control port of the third optical relay 410C is electrically coupled to the GND port of the second group of ports 210.

In operation, when the particular signal 119 described above (e.g., 5V) is not communicated to the Vcc+port, the second routing circuitry 215B facilitates communicating the first information 117 described above (e.g., DC-OK signal) as indicated by the dashed lines. For example, when the signal (e.g., 5V) is not applied to the first control pin of the first optical relay 410A, the switch of the first optical relay 410A will be in an open state, thus preventing signal flow between the switch ports of the first optical relay 410A. Likewise, when the particular signal 119 is not applied to the first control pin of the third optical relay 410C, the switch of the third optical relay 410C will be in an open state, thus preventing signal flow between the switch ports of the third optical relay 410C. In this configuration, signals output from the first optocoupler 405A and signals output from the second optocoupler 405B are prevented from reaching the Data/DC+OK port and the Data/DC-OK−port of the second group of ports 210, respectively.

In this configuration, a signal communicated from the DC-OK port of the first group of ports 205 to the input port of the second optical relay 410B causes the switch of the second optical relay 410B to open and close in accordance with the voltage associated with the DC-OK signal communicated to the DC-OK port. For example, a high voltage (e.g., 5V) causes the switch of the second optical relay 410B to close. A low voltage (e.g., 0V) causes the switch of the second optical relay 410B to open. Thus, a system, such as a PLC 115, can determine the DC-OK signal by, for example, providing a source of current to the Data/DC+OK port, grounding the Data/DC−OK port, and measuring the current flow into the Data/DC+OK port.

Referring to FIG. 4B, when the particular signal 119 described above (e.g., 5V) is communicated to the Vcc+port, the second routing circuitry 215B facilitates communicating the second information 118 (e.g., USB data) as indicated by the dashed lines. For example, when the particular signal (e.g., 5V) is applied to the first control pin of the first optical relay 410A, the switch of the first optical relay 410A will be in a closed state, thus allowing signal flow between the switch ports of the first optical relay 410A. Likewise, when the signal (e.g., 5V) is applied to the first control pin of the third optical relay 410C, the switch of the third optical relay 410C will be in a closed state, thus allowing signal flow between the switch ports of the third optical relay 410C. In this configuration, signals output from the first optocoupler 405A and signals output from the second optocoupler 405B are allowed to reach the Data/DC+OK port and the Data/DC-OK−port, respectively. And as noted above in the case of bi-directional optocouplers, signals communicated in the opposite direction are allowed to reach the Data+port and the Data−port of the first group of ports 205, respectively Further, as noted previously with respect to FIG. 3, when the particular signal 119 described above (e.g., +5V) is applied to the Vcc+port of the second group of ports 210, the relay 305 of the first routing circuitry 215A closes and electrically couples the Vcc+port of the second group of ports 210 to the Vcc port of the first group of ports 205, and electrically couples the GND port of the second group of ports 210 to the GND port of the first group of ports 205. Thus, in an example configuration, coupling of the second group of ports 210 to a USB port of a computer 110 will control the interface circuit 130 to facilitate routing second information 118 (e.g., USB data) between the computer 110 and the controller 125.

Figure 5:
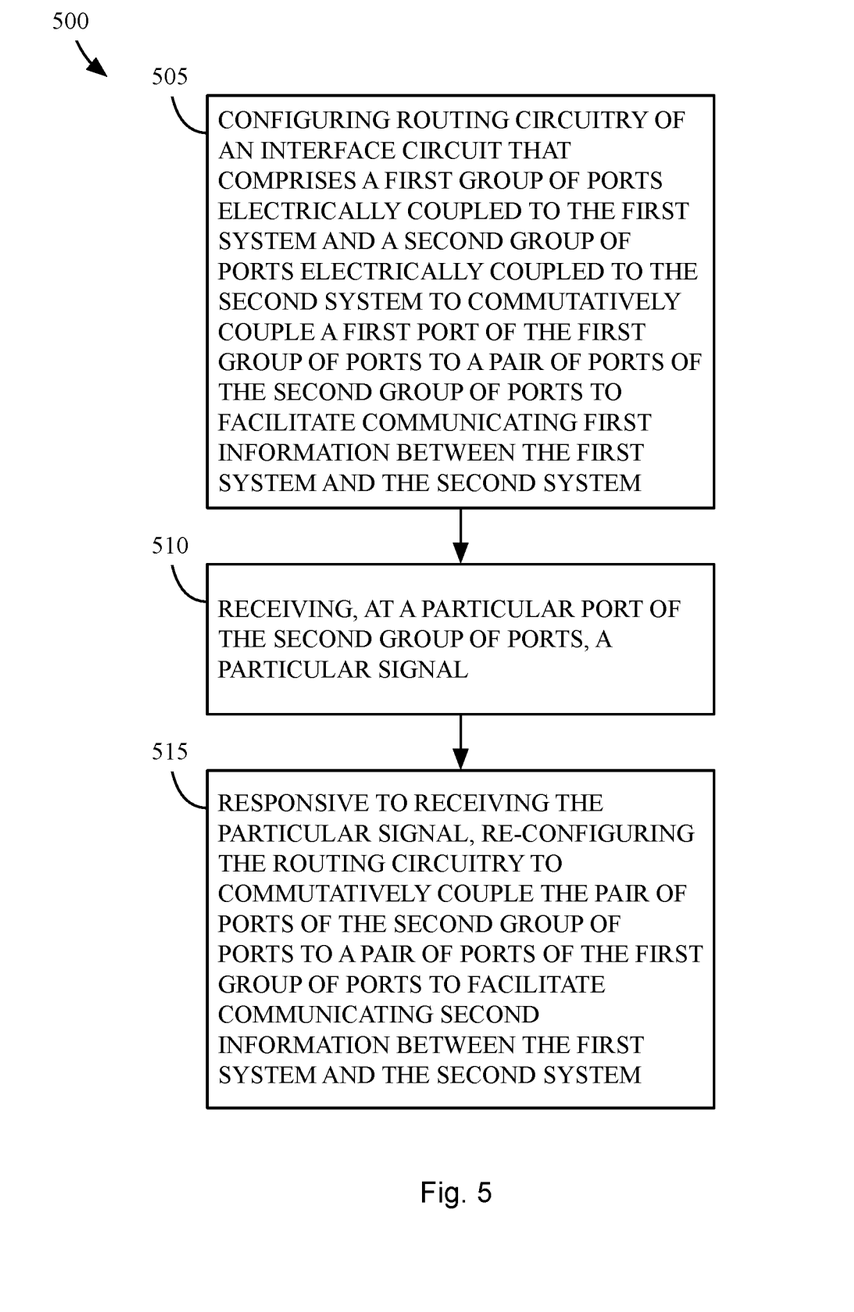
FIG. 5 illustrates operations that facilitate communicating information between a first system and a second system, in accordance with an example.

FIG. 5 illustrates examples of operations 500 that facilitate communicating information between a first system 105 and a second system 115. The operations at block 505 involve configuring routing circuitry 215 of an interface circuit 130 that comprises a first group of ports 205 electrically coupled to the first system 105 and the second group of ports 210 electrically coupled to the second system 115 to commutatively couple a first port of the first group of ports 205 to a pair of ports (210B, 210C) of the second group of ports 210 to facilitate communicating first information 117 between the first system 105 and the second system 115.

The operations at block 510 involve receiving, at a particular port 210A of the second group of ports 210, a particular signal 119.

The operations at block 515 involve, responsive to receiving the particular signal 119, re-configuring the routing circuitry 215 to commutatively couple the pair of ports (210B, 210C) of the second group of ports 210 to a pair of ports (205A, 205B) of the first group of ports 205 to facilitate communicating second information 118 between the first system 105 and the second system 110.

In an example, the first system 105 corresponds to a power supply. In this example, communicating the first information 117 comprises communicating a DC-OK signal to the second system 110 that facilitates determining, by the second system 110, that the power supply 105 is actively providing power. In an example, communicating the second information 118 comprises communicating universal serial bus (USB) data that facilitates programming, by the second system 110, firmware of the power supply.

In an example, the second group of ports 210 comprises a second pair of ports (210A, 210B). In this example, re-configuring the routing circuitry 215 further comprises configuring the routing circuitry 215 to electrically couple the second pair of ports (210A, 210B) to a power supply port and a ground port of the first group of ports 205, respectively, when the particular signal 119 is applied to the particular port 210A.

In an example, the routing circuitry 215 further comprises a relay 305 electrically coupled to the particular port 210A, and the particular signal 119 corresponds to a power supply voltage. In this example, re-configuring the routing circuitry 215 further comprises controlling the relay 305 to close and to communicate the power supply voltage to the power supply port of the first group of ports 205.

In an example, configuring the routing circuitry 215 to facilitate communicating the first information 117 between the first system 105 and the second system 110 further comprises configuring the routing circuitry 215 to optically couple the first port 205C of the first group of ports 205 to the pair of ports (210B, 210C) of the second group of ports 210. And configuring the routing circuitry 215 to facilitate communicating the second information 118 between the first system 105 and the second system 110 further comprises configuring the routing circuitry 215 to optically couple the pair of ports (210B, 210C) of the second group of ports 210 to the pair of ports (205A, 205B) of the first group of ports.

In an example, the routing circuitry 215 comprises a first solid-state relay 410B. In this example, configuring the routing circuitry 215 to optically couple the first port 205A of the first group of ports 205 to the pair of ports (210B, 210C) of the second group of ports 210 further comprises configuring the routing circuitry 215 to optically couple the first port 205A of the first group of ports 205 to the pair of ports (210B, 210C) of the second group of ports 210 via the solid-state relay 410B.

In an example, the routing circuitry 215 comprises a first optocoupler 405A configured to facilitate optically coupling a first port 210B of the pair of ports (210B, 210C) of the second group of ports 210 to a first port 205A of the pair of ports (205A, 250B) of the first group of ports 205. The routing circuitry 215 further comprises a second optocoupler 405B configured to facilitate optically coupling a second port 210C of the pair of ports (210B, 210C) of the second group of ports 210 to a second port 205B of the pair of ports (205A, 250B) of the first group of ports 205.

In an example, the routing circuitry 215 comprises a second solid-state relay 410A configured to selectively route a first signal communicated to the first port 210B of the pair of ports (210B, 210C) of the second group of ports 210 to the first optocoupler 405A responsive to application of the particular signal 119. The routing circuitry 215 further comprises a third solid-state relay 410C configured to selectively route a second signal communicated to the second port 210C of the pair of ports (210B, 210C) of the second group of ports 210 to the second optocoupler 405B responsive to application of the particular signal 119.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An interface circuit that facilitates communicating information between a first system and a second system, the interface circuit comprising:
   a first group of ports configured to be electrically coupled to the first system;
   a second group of ports configured to be electrically coupled to the second system; and
   routing circuitry electrically coupled to the first group of ports and the second group of ports, wherein the routing circuitry is configured to:
      electrically couple a first port of the first group of ports to a first pair of ports of the second group of ports to facilitate communicating first information applied to the first port of the first group of ports to the first pair of ports of the second group of ports, and
      in response to a particular signal being applied to a particular port of the second group of ports:
         electrically couple the first pair of ports of the second group of ports to a first pair of ports of the first group of ports to facilitate communicating second information between the first pair of ports of the second group of ports and the first pair of ports of the first group of ports, and
         electrically couple a second pair of ports of the second group of ports to a second pair of ports of the first group of ports.

2. The interface circuit according to claim 1, wherein the first system corresponds to a power supply, and the first information corresponds to a DC-OK signal that facilitates determining, by the second system, that the power supply is actively providing power.

3. The interface circuit according to claim 2, wherein the second information comprises universal serial bus (USB) data that facilitates programming firmware of the power supply.

4. The interface circuit according to claim 1, wherein the routing circuitry is configured to electrically couple the second pair of ports to a power supply port and a ground port of the first group of ports, respectively, when the particular signal is applied to the particular port.

5. The interface circuit according to claim 4, wherein the routing circuitry further comprises:
a relay electrically coupled to the particular port, wherein the particular signal corresponds to a power supply voltage, wherein application of the power supply voltage to the particular port controls the relay to close and to communicate the power supply voltage to the power supply port of the first group of ports.

6. The interface circuit according to claim 1, wherein when the particular signal is not applied to the particular port, the routing circuitry is configured to optically couple the first port of the first group of ports to the first pair of ports of the second group of ports, and when the particular signal is applied to the particular port, the routing circuitry is configured to optically couple the first pair of ports of the second group of ports to the first pair of ports of the first group of ports.

7. The interface circuit according to claim 6, wherein the routing circuitry comprises a first solid-state relay that facilitates optically coupling the first port of the first group of ports to the first pair of ports of the second group of ports.

8. The interface circuit according to claim 7, wherein the routing circuitry comprises a first optocoupler configured to facilitate optically coupling a first port of the first pair of ports of the second group of ports to the first port of the first pair of ports of the first group of ports, and a second optocoupler configured to facilitate optically coupling a second port of the first pair of ports of the second group of ports to a second port of the first pair of ports of the first group of ports.

9. The interface circuit according to claim 8, wherein the routing circuitry comprises a second solid-state relay configured to selectively route a first signal communicated to the first port of the first pair of ports of the second group of ports to the first optocoupler responsive to application of the particular signal, and a third solid-state relay configured to selectively route a second signal communicated to the second port of the first pair of ports of the second group of ports to the second optocoupler responsive to application of the particular signal.

10. The interface circuit according to claim 1, wherein the first system corresponds to a power supply, and the first information corresponds to a DC-OK signal that facilitates determining, by the second system, that the power supply is actively providing power, and wherein the second information comprises universal serial bus (USB) data that facilitates programming firmware of the power supply.

11. The interface circuit according to claim 1, wherein:
the first port of the first group of ports comprises a DC-OK port,
the first pair of ports of the first group of ports comprises a Data+port and a Data−port,
the first group of ports further comprises a second pair of ports comprising a power supply port and a ground port,
the first pair of ports of the second group of ports comprises a Data/DC-OK+port and a Data/DC-OK−port,
the second group of ports further comprises a second pair of ports comprising a Vcc+port and a ground port that are configured to be coupled to a power port of the second system, and
the particular port of the second group of ports is the Vcc+port.

12. A system comprising:
a first subsystem;
a second subsystem; and
a circuit that facilitates communicating information between the first subsystem and the second subsystem, the circuit comprising:
a first group of ports configured to be electrically coupled to the first subsystem;
a second group of ports configured to be electrically coupled to the second subsystem; and
routing circuitry electrically coupled to the first group of ports and the second group of ports, wherein the routing circuitry is configured to:
electrically couple a first port of the first group of ports to a first pair of ports of the second group of ports to facilitate communicating first information applied to the first port of the first group of ports to the first pair of ports of the second group of ports, and
in response to a particular signal being applied to a particular port of the second group of ports:
electrically couple the first pair of ports of the second group of ports to a first pair of ports of the first group of ports to facilitate communicating second information between the first pair of ports of the second group of ports and the first pair of ports of the first group of ports, and
electrically couple a second pair of ports of the second group of ports to a second pair of ports of the first group of ports.

13. The system according to claim 12, wherein the first subsystem corresponds to a power supply, and the first information corresponds to a DC-OK signal that facilitates determining, by the second subsystem, that the power supply is actively providing power.

14. The system according to claim 12, wherein the particular port corresponds to one of the second pair of ports, wherein the routing circuitry is configured to electrically couple the second pair of ports to a power supply port and a ground port of the first group of ports, respectively, when the particular signal is applied to the particular port.

15. The system according to claim 14, wherein the routing circuitry further comprises:
a relay electrically coupled to the particular port, wherein the particular signal corresponds to a power supply voltage, wherein application of the power supply voltage to the particular port controls the relay to close and to communicate the power supply voltage to the power supply port of the first group of ports.

16. The system according to claim 12, wherein when the particular signal is not applied to the particular port, the routing circuitry is configured to optically couple the first port of the first group of ports to the first pair of ports of the second group of ports, and when the particular signal is applied to the particular port, the routing circuitry is configured to optically couple the first pair of ports of the second group of ports to the first pair of ports of the first group of ports.

17. The system according to claim 16, wherein the routing circuitry comprises a first solid-state relay that facilitates optically coupling the first port of the first group of ports to the first pair of ports of the second group of ports.

18. The system according to claim 17, wherein the routing circuitry comprises a first optocoupler configured to facilitate optically coupling a first port of the first pair of ports of the second group of ports to the first port of the first pair of ports of the first group of ports, and a second optocoupler configured to facilitate optically coupling a second port of the first pair of ports of the second group of ports to a second port of the first pair of ports of the first group of ports.

19. The system according to claim 18, wherein the routing circuitry comprises a second solid-state relay configured to selectively route a first signal communicated to the first port of the first pair of ports of the second group of ports to the first optocoupler responsive to application of the particular signal, and a third solid-state relay configured to selectively route a second signal communicated to the second port of the first pair of ports of the second group of ports to the second optocoupler responsive to application of the particular signal.

20. A method for communicating information between a first system and a second system, the method comprising:

configuring routing circuitry of an interface circuit that comprises a first group of ports electrically coupled to the first system and a second group of ports electrically coupled to the second system to commutatively couple a first port of the first group of ports to a first pair of ports of the second group of ports to facilitate communicating first information applied to the first port of the first group of ports to the first pair of ports of the second group of ports;

receiving, at a particular port of the second group of ports, a particular signal; and responsive to receiving the particular signal, re-configuring the routing circuitry to:
    commutatively couple the first pair of ports of the second group of ports to a first pair of ports of the first group of ports to facilitate communicating second information between the first pair of ports of the second group of ports and the first pair of ports of the first group of ports, and
    commutatively couple a second pair of ports of the second group of ports to a second pair of ports of the first group of ports.

\* \* \* \* \*